(No Model.)
LA FAYETTE W. PAGE & S. HARDEMAN.
ANIMAL TRAP.
No. 378,972. Patented Mar. 6, 1888.
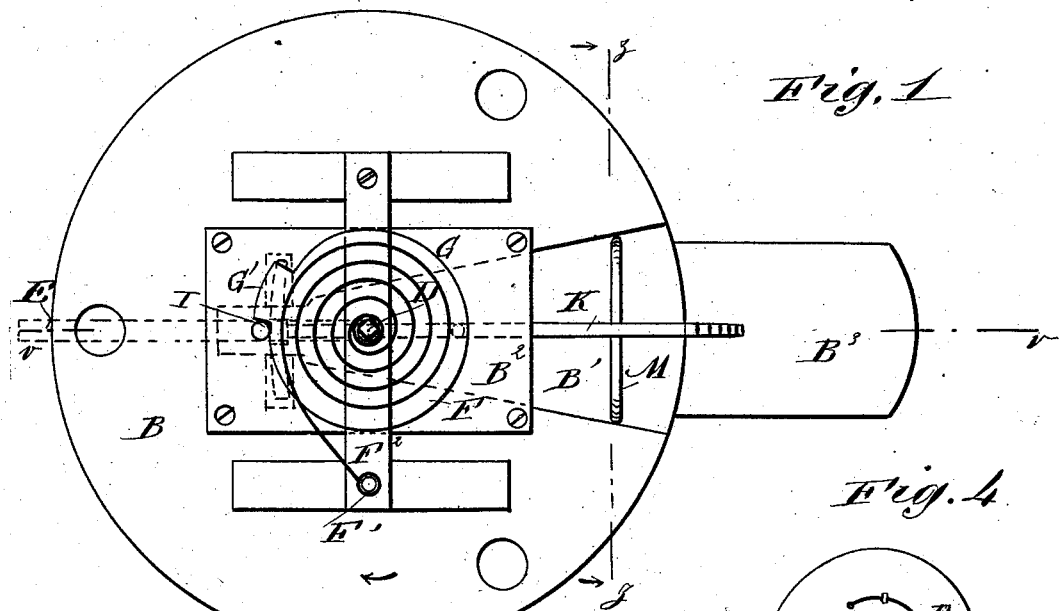
Fig. 1
Fig. 4
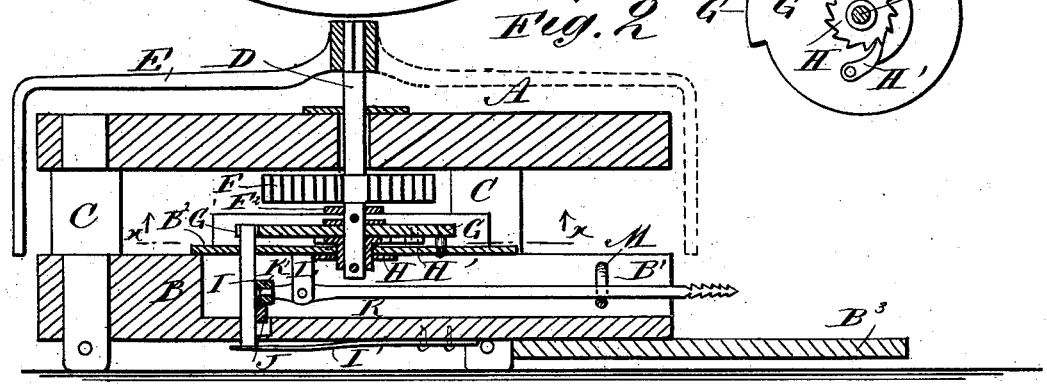
Fig. 2
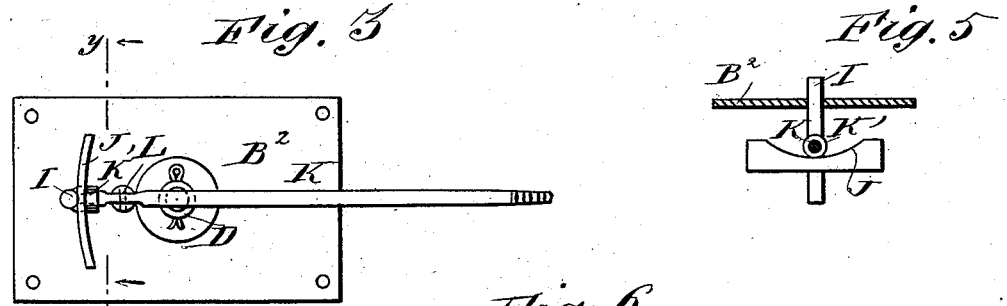
Fig. 3
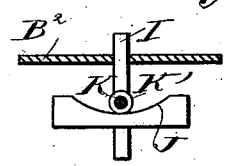
Fig. 5
Fig. 6
WITNESSES:
C. Neveux
E. M. Clark
INVENTOR:
L. W. Page
Samuel Hardeman
BY Munn & Co.
ATTORNEYS.

UNITED STATES PATENT OFFICE.

LA FAYETTE W. PAGE AND SAMUEL HARDEMAN, OF FRANKLIN, TENNESSEE.

ANIMAL-TRAP.

SPECIFICATION forming part of Letters Patent No. 378,972, dated March 6, 1888.

Application filed July 25, 1887. Serial No. 245,261. (No model.)

*To all whom it may concern:*

Be it known that we, LA FAYETTE W. PAGE and SAMUEL HARDEMAN, both of Franklin, in the county of Williamson and State of Tennessee, have invented a certain new and useful Improvement in Animal-Traps, of which the following is a specification.

The object of our improvement is to provide a trap for rats and kindred animals that with a single setting will kill a larger number of such animals and with greater certainty than is ordinarily possible.

An animal-trap embodying our improvement will first be described in detail, and the various features of the improvement then pointed out in the claims.

Reference is to be had to the accompanying drawings, forming a part of this specification, in which similar letters of reference designate corresponding parts in all the figures.

Figure 1 is a plan view of an animal-trap embodying our improvement, the top of the casing being removed. Fig. 2 is a vertical sectional view of the said trap on the line $vv$, Fig. 1. Fig. 3 is an inverted plan view of the mechanism of the trap. Fig. 4 is an inverted sectional plan view on the line $xx$, Fig. 2. Fig. 5 is a detail sectional view on the line $yy$, Fig. 3. Fig. 6 is a detail sectional view on the line $zz$, Fig. 1.

The casing of the trap is here shown composed of circular top and bottom plates, A B, spaced and connected by posts C. The lower plate, B, has a radial outwardly-flaring recess, B', in its upper face, a bearing-plate, $B^2$, fixed over the inner part of said recess, and a radial projection, $B^3$, which serves as a handle in setting the trap.

A vertical shaft, D, is journaled centrally to the top plate, A, and bearing-plate $B^2$, and to its upper end, above the plate A, is attached a radial arm, E, the outer part of which is bent downward just beyond the edge of the plate E, and extends to or near the edge of the bottom plate, B.

A stout coiled spring, F, is attached at one end to the shaft D and at the other end to a stud, F', fixed on a bridge, $F^2$, in which the shaft D is also mounted to turn.

An eccentric disk, G, having a lug, G', projecting from its periphery, is mounted loosely on the shaft D just above the bearing-plate $B^2$, and is connected with said shaft by a ratchet, H, and spring-actuated pawl, H', so that the shaft D can be freely turned by means of the arm E in the direction of the arrow, Fig. 1, to wind up the spring F; but the spring in uncoiling will compel the disk G to rotate with the shaft D and arm E.

A stop-pin or detent, I, is mounted to slide vertically in the bearing-plate $B^2$ and bottom plate, B, and is normally projected above the plate $B^2$ to engage the lug G' on the disk G by means of a spring, I', bearing against its lower end.

A transverse upwardly-concave camway, J, is fixed to the pin I, and a friction-roller, K', on the inner end of the bait-lever K is adapted to run on said camway.

The bait-lever K is pivoted to swing vertically on a hanger, L, depending from and mounted to turn in the bearing-plate $B^2$, and is thus mounted on a universal joint.

An upwardly-concave bridge, M, is fixed across the front end of the tapering recess B', on which bridge the front portion of the bait-lever K rests. Thus when the projecting end of the bait-lever, which is notched, as usual, to more firmly hold the bait, is raised by the animal in nibbling at the bait, it depresses the detent I, or when moved laterally it is elevated by the cam-like form of the bridge M, and its rear end, riding on the camway J, depresses the same with the pin-detent I. Thus in either case the detent I will be disengaged from the shoulder at the front side of the lug G' on the disk G, allowing the spring F in uncoiling to rapidly swing the arm E on the shaft D, the downward bend of which arm will strike the animal a swift blow on the side of the head, killing him and throwing him to one side. The spring-actuated detent I will again engage the shoulder on the disk G at the end of a single revolution, the eccentricity of the approach to said shoulder serving to brake the movement of the disk and connections. The bait-lever will further be thrown by the spring I' and camway J into a central position, so that the trap will be automatically set for another animal.

The trap will thus act effectually until the spring F has entirely uncoiled, in which time a large number of animals may be killed.

Instead of the disk G having the peripheral lug G' and the ratchet and pawl connecting the disk with the striker-shaft, the disk may be rigidly attached to the said shaft and have a single tooth on its under side to engage the detent I. Further, any well-known form of treadle-trigger may be used to cause the bait-lever to rise, and thus release the striker, on the animal stepping on the treadle, even when the bait is not touched.

Having thus described our invention, what we claim as new, and desire to secure by Letters Patent, is—

1. In an animal-trap, the combination of a striker, a spring-actuated rotary shaft on which the same is mounted, a disk mounted loosely on the shaft, a ratchet and pawl connecting said shaft and disk and permitting free rotation of the shaft for winding the spring, and a detent for engaging said disk, substantially as described.

2. In an animal-trap, the combination of a striker, a rotary disk connected therewith, having a stop-shoulder and an eccentric approach to said stop-shoulder, and a spring-actuated detent adapted to ride on said eccentric approach to the stop shoulder, substantially as described.

3. In an animal-trap, the combination, with the co-operating mechanism of the trap, of a vertically-sliding detent, a concave curved camway, and a pivotal bait-lever adapted to ride on said camway and operate the detent, substantially as described.

LA FAYETTE W. PAGE.
SAMUEL HARDEMAN.

Witnesses:
JOHN M. NEVILS,
HUGH D. CAMPBELL.